(12) United States Patent
Schnell et al.

(10) Patent No.: US 7,344,141 B2
(45) Date of Patent: Mar. 18, 2008

(54) COLLET SYSTEM FOR ROTARY TOOLS

(75) Inventors: John W. Schnell, Anderson, SC (US); Daniel Paxton Wall, Humboldt, TN (US)

(73) Assignee: Black & Decker Inc., Newark, DE (US)

( * ) Notice: Subject to any disclaimer, the term of this patent is extended or adjusted under 35 U.S.C. 154(b) by 434 days.

(21) Appl. No.: 11/048,640

(22) Filed: Jan. 31, 2005

(65) Prior Publication Data
US 2006/0110229 A1 May 25, 2006

Related U.S. Application Data

(60) Provisional application No. 60/540,845, filed on Jan. 30, 2004.

(51) Int. Cl.
*B23B 31/02* (2006.01)

(52) U.S. Cl. .................... 279/150; 409/182; 408/241 S
(58) Field of Classification Search ........ 279/147–150; 409/182; 408/241 S
See application file for complete search history.

(56) References Cited

U.S. PATENT DOCUMENTS

| 5,496,139 | A | * | 3/1996 | Ghode et al. | 409/182 |
| 5,813,805 | A | * | 9/1998 | Kopras | 408/241 R |
| 5,829,931 | A | * | 11/1998 | Doumani | 409/182 |
| 5,902,080 | A | * | 5/1999 | Kopras | 409/182 |
| 6,042,310 | A | * | 3/2000 | Campbell et al. | 409/131 |
| 6,224,304 | B1 | * | 5/2001 | Smith et al. | 409/182 |
| 6,350,087 | B1 | * | 2/2002 | Berry et al. | 409/131 |
| 6,648,567 | B2 | * | 11/2003 | Berry et al. | 409/182 |
| 6,913,429 | B1 | * | 7/2005 | Phillips et al. | 409/182 |
| 7,293,944 | B2 | * | 11/2007 | Lui | 409/182 |
| 2002/0090274 | A1 | * | 7/2002 | Berry et al. | 409/182 |

* cited by examiner

*Primary Examiner*—Monica Carter
*Assistant Examiner*—Eric A. Gates
(74) *Attorney, Agent, or Firm*—Scott B. Markow

(57) ABSTRACT

A collet system for a rotary tool includes a collet for receiving a bit; a wrench assembly for engaging the collet, the wrench assembly moving along an axis extending axially through the collet between a first position where the wrench assembly is disengaged from the collet and a second position where the wrench assembly is engaged with the collet; and an adjusting collar coupled to the wrench assembly for moving the wrench assembly between the first position and the second position, wherein upon moving the wrench assembly to the second position, the adjusting collar is rotatable for rotating the wrench assembly to tighten and loosen the collet.

7 Claims, 6 Drawing Sheets

COLLET SYSTEM FOR ROTARY TOOLS

CROSS-REFERENCE TO RELATED APPLICATIONS

The present application claims priority under 35 U.S.C. § 119(e) to U.S. Provisional Application No. 60/540,845 entitled: Wrench-less Collet System For Power Tools filed Jan. 30, 2004, which is hereby incorporated by reference in its entirety.

FIELD OF THE INVENTION

The present invention generally relates to the field of rotary tools used for woodworking, metalworking, or the like, and, in particular, to a collet system for rotary tools employing removable bits.

BACKGROUND OF THE INVENTION

Rotary tool users may couple a variety of bits to their tools. For example, a cutout tool may accept ⅛" and ¼" inch bits. Other rotary tools, such as a laminate trimmer, or a drywall router, may also accept a range of different-sized bits depending on the particular job being performed. Also, rotary tools may employ various types of bits, each bit suited for use with a particular material, such as aluminum, steel, hard wood, or soft wood. Because rotary tool users are frequently required to change the size or type of bit to adapt the tool to the job being performed, or to replace bits that have become dull, there is a corresponding need for a system that makes bit replacement quick and easy.

Currently, many rotary tools employ a system that requires a separate wrench, commonly referred to as a "key", to replace bits. The key must be inserted into a collet and turned before the bit can be released. Accordingly, the key must be used again to secure a replacement bit in the collet. The "key" system is inefficient because the key can be easily misplaced among debris that is common to every workplace, thereby hindering a user's efforts to replace bits and finish their job quickly.

Therefore, it would be advantageous to have a collet system that removes the necessity of a separate wrench or key, thereby providing a more efficient manner of replacing bits.

SUMMARY OF THE INVENTION

Accordingly, the present invention is directed to a collet system for a rotary tool that provides a more efficient manner of replacing bits. In an exemplary embodiment, the collet system includes a collet for receiving a bit and a wrench assembly for engaging the collet. The wrench assembly moves along an axis extending axially through the collet between a first position, where the wrench assembly is disengaged from the collet, and a second position, where the wrench assembly is engaged with the collet. The exemplary embodiment further includes an adjusting collar coupled to the wrench assembly for moving the wrench assembly between the first position and the second position, wherein upon moving the wrench assembly to the second position, the adjusting collar is rotatable for rotating the wrench assembly to tighten and loosen the collet.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

generally now to FIGS. 1 through 6, a rotary tool 100 having a collet system 130 in accordance with an exemplary embodiment of the present invention is shown. In the present embodiment, the rotary tool 100 comprises a drywall router. However, it is contemplated that other tools may be equipped with the collet system 130 of the present invention. For example, tools such as a cutout tool, a laminate trimmer, a router and the like may be equipped with the collet system 130 without departing from the scope and spirit of the present invention.

Figure 1:
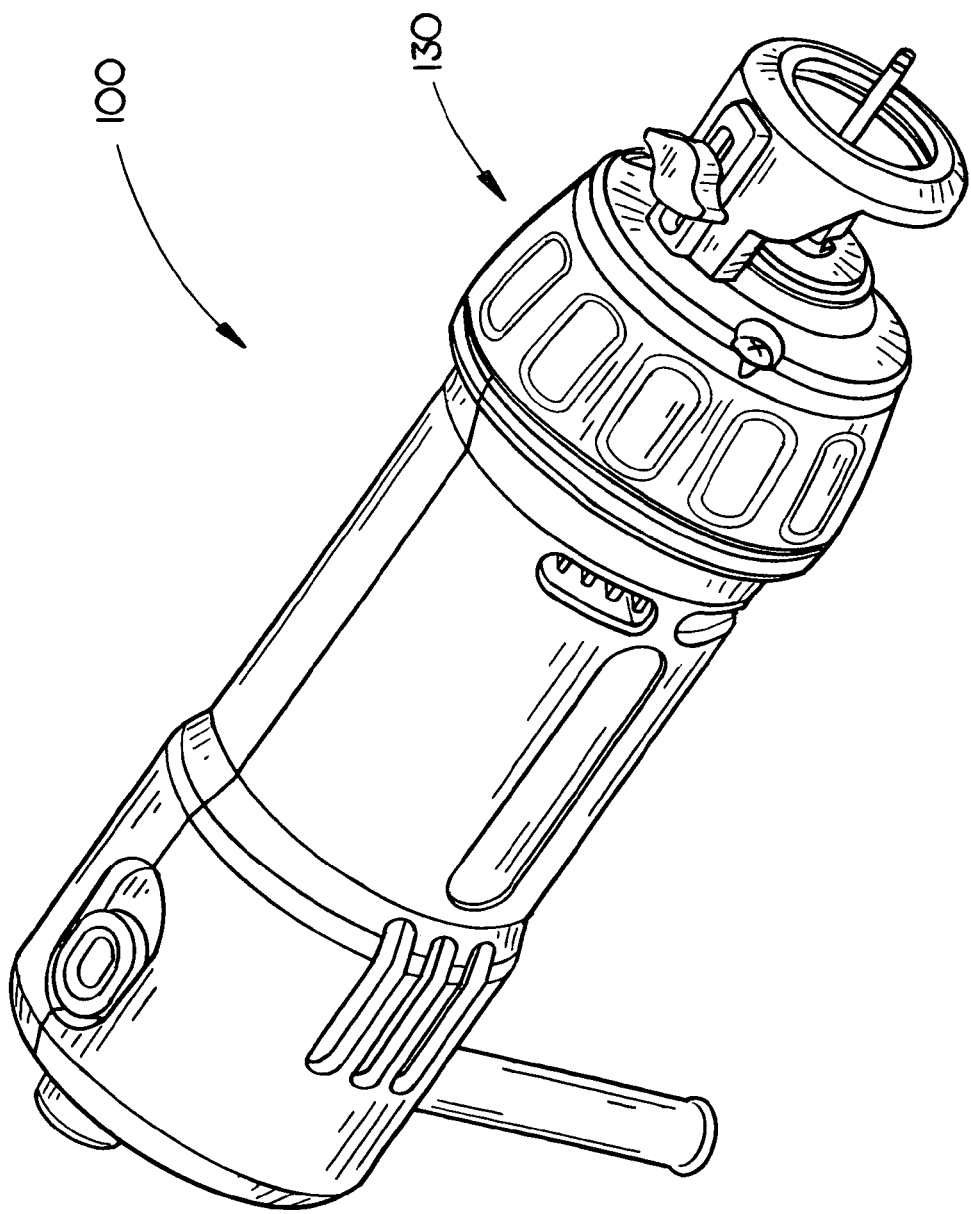
FIG. 1 is an isometric view of a rotary tool equipped with a collet system in accordance with an exemplary embodiment of the present invention.
Figure 2:
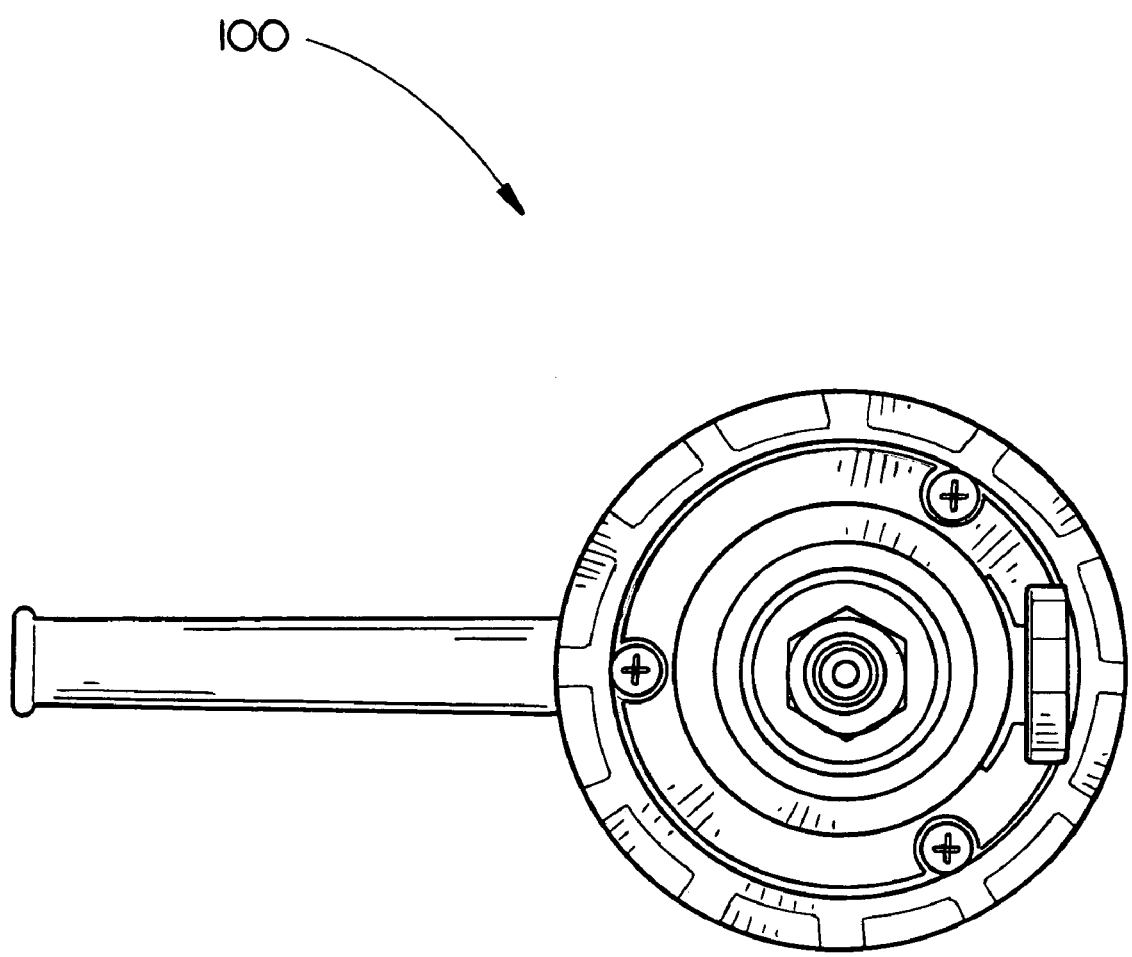
FIG. 2 is a perspective view of a rotary tool equipped with a collet system in accordance with an exemplary embodiment of the present invention.
Figure 3:
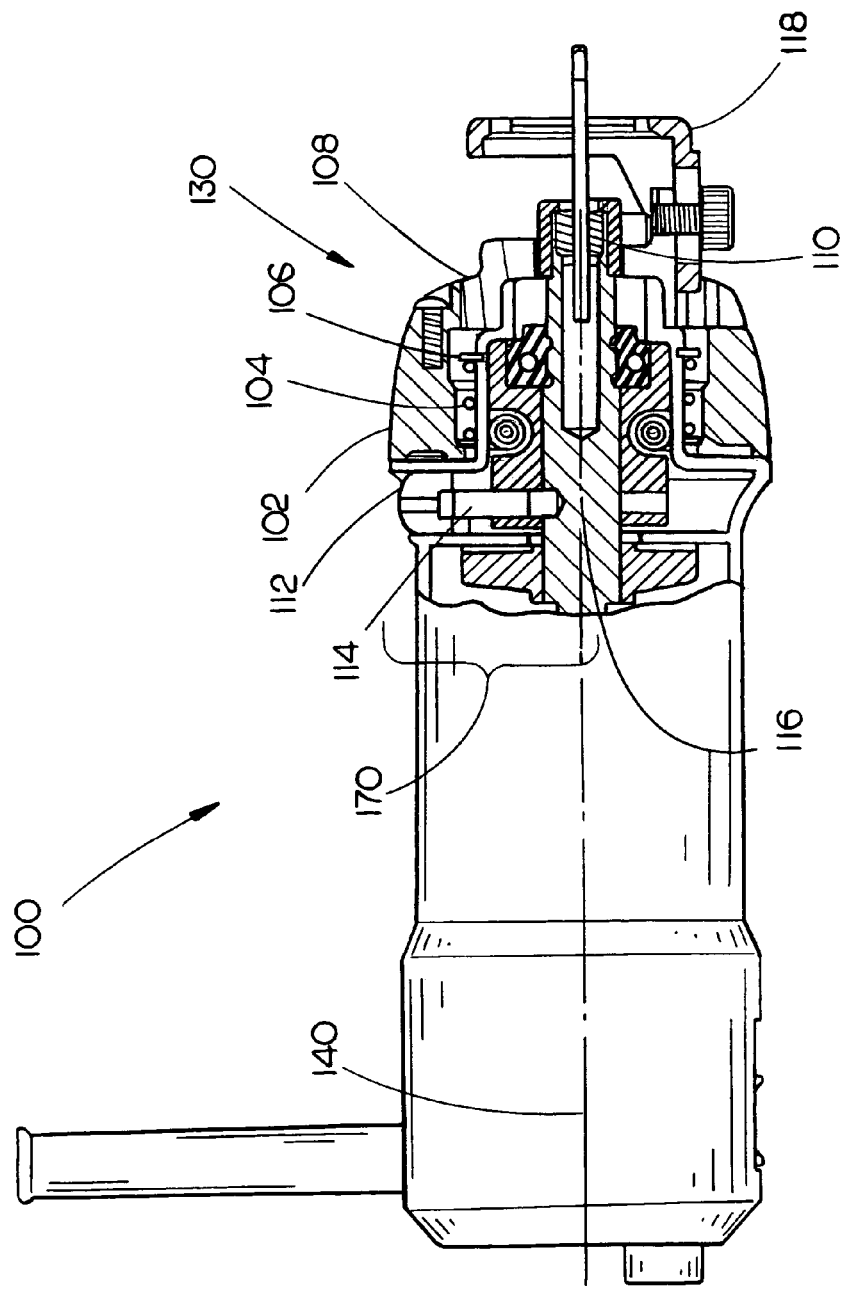
FIG. 3 is a cross-sectional view of a rotary tool equipped with a collet system, shown in a disengaged position.
Figure 4:
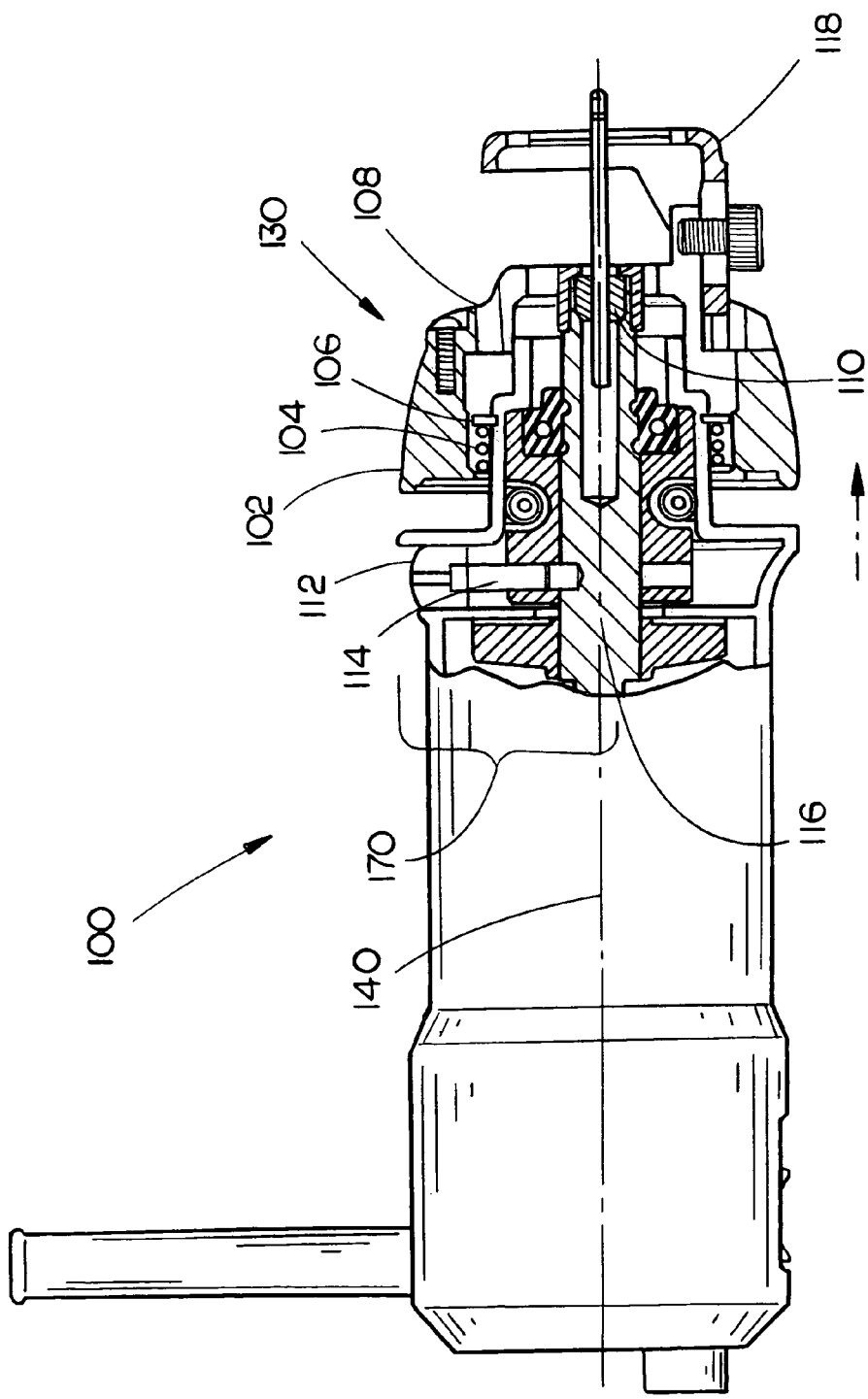
FIG. 4 is a cross-sectional view of a rotary tool equipped with a collet system, shown in an engaged position.

As shown, the collet system 130 includes a collet 110 for receiving a bit and a wrench assembly 108 for engaging the collet 110. The wrench assembly 108 moves along an axis 140 extending axially through the collet 110 between a first position (as shown in FIG. 3) where the wrench assembly 108 is disengaged from the collet 110 and a second position (as shown in FIG. 4) where the wrench assembly 108 is engaged with the collet 110. Further included is an adjusting collar 102 which is coupled to the wrench assembly 108 for moving the wrench assembly 108 between the first position and the second position, wherein upon moving the wrench assembly 108 to the second position, the adjusting collar 102 is rotatable for rotating the wrench assembly 108 to tighten and loosen the collet 102.

In an exemplary embodiment, the adjusting collar 102 is coupled to the wrench assembly 108. In further embodiments, the wrench assembly 108 is integral or co-molded with the adjusting collar 102.

As shown in FIGS. 3 and 4, the adjusting collar 102 and the wrench assembly 108 move together axially along an axis 140 defined by a drive shaft 116 of the rotary tool 100. The axis 140 extends axially through the collet 110, the collet 110 for receiving a bit and coupled with an end of the drive shaft 116, the drive shaft 116 configured for rotating the bit. Accordingly, the adjusting collar 102 allows a user to engage the wrench assembly 108 with the collet 110 by pushing the adjusting collar 102 toward the collet 110.

The adjusting collar 102 may be biased toward one of the first position and the second position. For example, in the exemplary embodiment shown, the collet system 130 includes a spring assembly 104 for biasing the adjusting collar 102 toward one of the first position and the second position. The spring assembly 104 is attached between the adjusting collar 102 and a housing of the rotary tool 100 and biases the adjusting collar 102 so that the adjusting collar 102 returns to the first (disengaged) position (i.e.-towards the tool housing) when the user releases the adjusting collar 102. Alternatively, the spring assembly 104 may bias the adjusting collar 102 toward the second (engaged) position. (i.e.-away from the tool housing toward the collet).

The collet system 130 may further include a retaining ring 106 coupled with the adjusting collar 102 for retaining the spring assembly 104. For example, as shown, the retaining ring 106 may be configured for insertion within a correspondingly-shaped groove disposed on the interior surface of the adjusting collar 102.

In an exemplary embodiment, the adjusting collar 102 may include a plurality of detents 150, slots and the like which are configured to engage with a plurality of corresponding protrusions disposed on the housing of the rotary tool 100 so that, upon being positioned in the first (disengaged) position (shown in FIG. 3), the adjusting collar 102 mechanically engages with the housing to prevent the adjusting collar 102 from rotating while the adjusting collar 102 is in the first position.

When in the second (engaged) position (shown in FIG. 4), the wrench assembly 108 engages the collet 110. In the present embodiment, the collet 110 has a shaped head for engagement with the wrench assembly 108. For example, in the embodiment illustrated, the shaped head of the collet 110 may be a hexagonal-shaped head. However, it is contemplated that the shaped head of the collet 110 may be any of a variety of shapes, depending on the application of the collet 110. Such shapes may include, but are not limited to a square-shaped head, a star-shaped head and the like.

In a present embodiment, the wrench assembly 108 is disc-shaped. In further embodiments, the wrench assembly 108 may be a variety of shapes. The wrench assembly 108 of the present invention further includes an engaging member or aperture 160, the aperture 160 being correspondingly shaped to engage the shaped head of the collet 110. In a preferred embodiment, the aperture 160 is axially aligned with the collet 110 along the axis 140 defined by the drive shaft 116 of the rotary tool 100.

The adjusting collar 102, upon positioning the wrench assembly 108 in the engage position, may be rotatable for rotating the wrench assembly 108 to loosen and tighten the collet 110. In this manner, the wrench assembly 108 of the collet system 130 may be used to loosen and tighten the collet 110, thus eliminating the need for a separate wrench or "key".

In embodiments of the invention, the collet system 130 further includes a spindle lock 170 for locking the drive shaft 116 of a rotary tool 100. In an exemplary embodiment, the spindle lock 170 includes a spindle lock button 112 and a lock button shaft 114. The spindle lock 170 is integrated with a rotary tool 100 and positioned on the rotary tool housing, so that the spindle lock button 112 may be easily accessed (See, e.g., FIG. 6). The spindle lock button 112 is coupled to the lock button shaft 114, which engages the drive shaft 116 of the rotary tool 100. When the spindle lock button 112 is depressed, the lock button shaft 114 applies a stopping force to the drive shaft 116 of the rotary tool 100. By locking the drive shaft 116, the collet 110 is held stationary allowing engagement by the wrench assembly 108 of the collet system 130.

Figure 5:
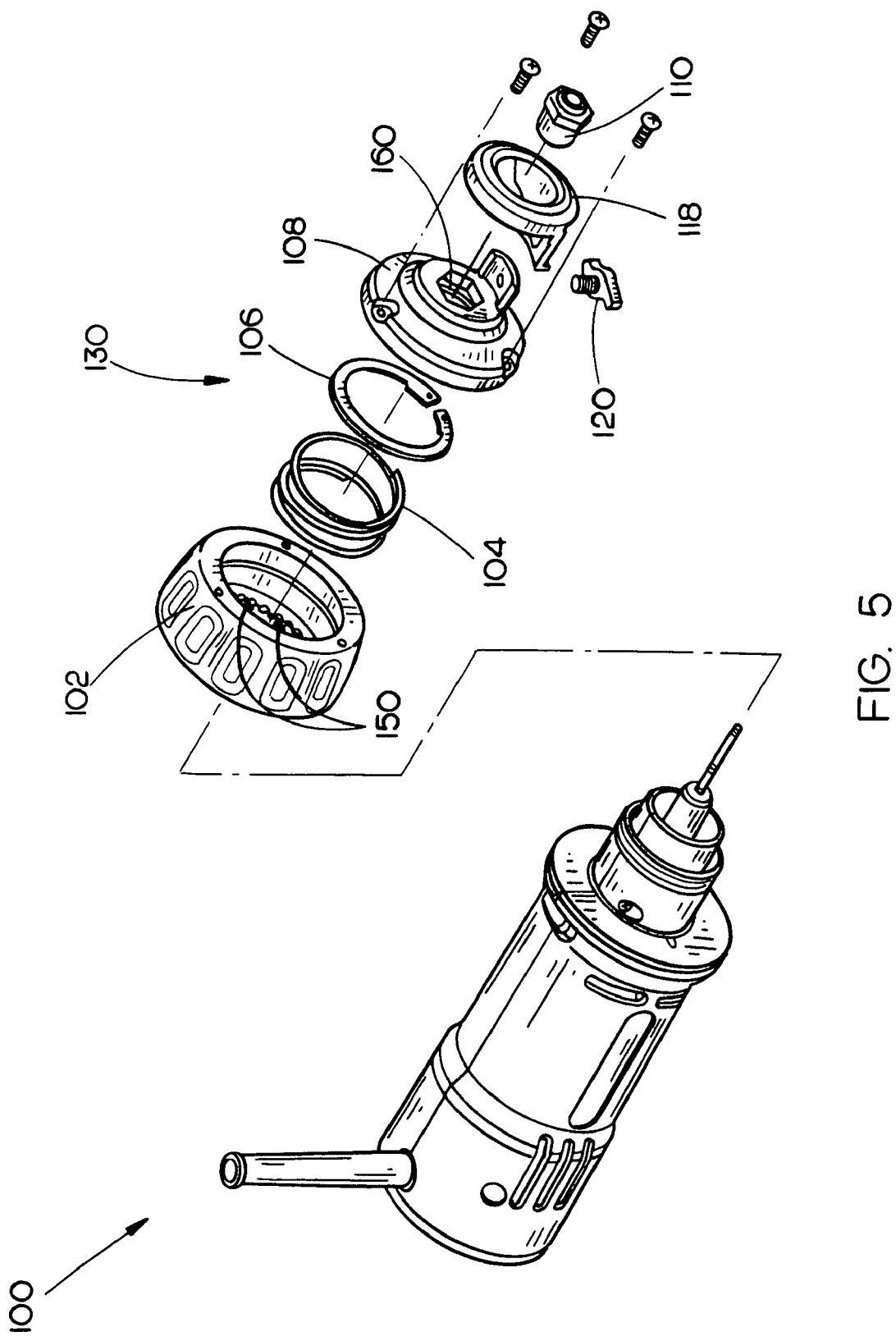
FIG. 5 is an exploded view of a rotary tool equipped with a collet system in accordance with an exemplary embodiment of the present invention.
Figure 6:
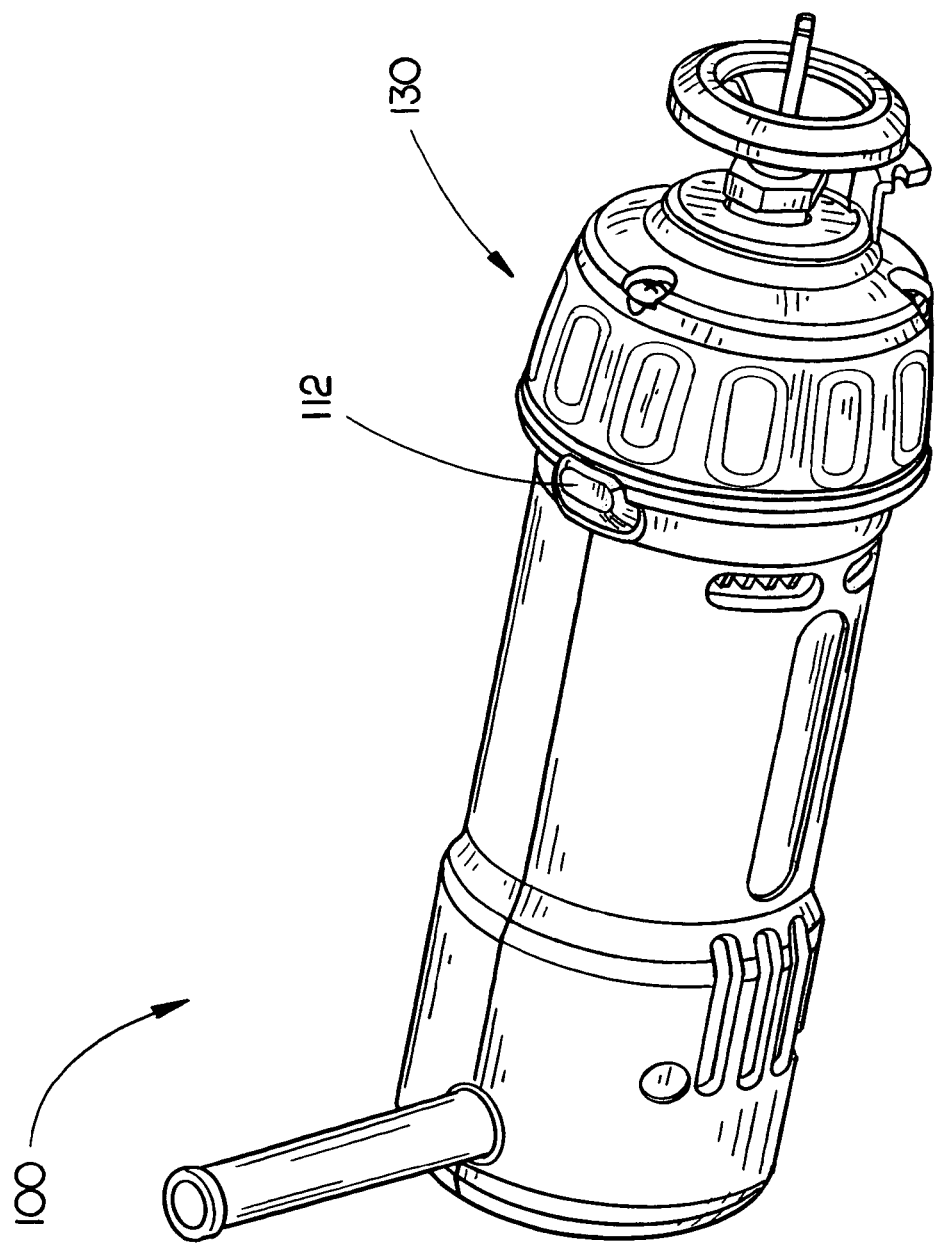
FIG. 6 is an isometric view of a rotary tool equipped with a collet system including a spindle lock button in accordance with an exemplary embodiment of the present invention.

The collet system 130 may further include a depth shoe 118. In the exemplary embodiment shown, the depth shoe 118 is coupled to the rotary tool 100 equipped with the collet system 130 (FIGS. 1-6). The depth shoe 118 allows a user to set the depth that the bit of the tool 100, will enter a workpiece (e.g.-drywall, metal, etc.). Additionally, the depth shoe 118 may include a shoe clamp 120 for adjustably setting the depth position of the depth shoe 118. In exemplary embodiments, the shoe clamp 120 may comprise a wing nut so that it can be loosened and tightened. As shown in FIG. 5, the shoe clamp 120 couples a flange of the wrench assembly 108 to a flange of a depth shoe 118. Further, at least one of the wrench assembly flange and the depth shoe flange may include slots for accepting the shoe clamp 120 and allowing the shoe clamp 120 to adjustably set the depth position of the depth shoe 118. The depth shoe 118 is attached to the wrench assembly 108, thus the depth shoe 118 is rotatable by rotating the adjusting collar 102 while the adjusting collar 102 is between a first (disengaged) position and a second (engaged) position. By providing a way to change the radial orientation of the depth shoe 118, visibility and accessibility to the bit may be increased.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A collet system for a rotary tool, comprising:
   a collet for receiving a bit; a wrench assembly for engaging the collet, the wrench assembly moving along an axis extending axially through the collet between a first position where the wrench assembly is disengaged from the collet and a second position where the wrench assembly is engaged with the collet;
   an adjusting collar coupled to the wrench assembly for moving the wrench assembly between the first position and the second position, wherein upon moving the wrench assembly to the second position, the adjusting collar is rotatable for rotating the wrench assembly to tighten and loosen the collet; and
   a depth shoe for setting an entry depth for the bit, wherein the depth shoe is rotatable by rotating the adjusting collar when the adjusting collar is positioned between the first and second positions.

2. A collet system as claimed in claim 1, further comprising a spring assembly for biasing the adjusting collar toward the first position.

3. A collet system as claimed in claim 2, further comprising a retaining ring coupled with the adjusting collar for retaining the spring assembly.

4. A collet system as claimed in claim 1, wherein the collet has a shaped head and the wrench assembly has an aperture correspondingly shaped to engage with the shaped head.

5. A collet system as claimed in claim 1, wherein the collet has a hexagonal-shaped head and the wrench assembly has an aperture correspondingly shaped to engage with the hexagonal-shaped head.

6. A collet system as claimed in claim 1, wherein the adjusting collar includes detents for locking the adjusting collar when the adjusting collar is in a first position.

7. A collet system as claimed in claim 1, wherein the depth shoe includes a shoe clamp for adjustably setting an entry depth for the bit.

\* \* \* \* \*